United States Patent [19]
Harris et al.

[11] 3,835,328
[45] Sept. 10, 1974

[54] IONIZATION SYSTEM FOR SENSING AND MEASURING GASEOUS IMPURITIES

[75] Inventors: William A. Harris, New Brighton; Bernard C. Schluter, Forest Lake; Erik T. Tromborg, Bloomington, all of Minn.

[73] Assignee: The United States of America as represented by the Secretary of the Air Force, Washington, D.C.

[22] Filed: May 12, 1972

[21] Appl. No.: 252,695

[52] U.S. Cl. .............................. 250/432, 250/308
[51] Int. Cl. .......................................... G01n 23/12
[58] Field of Search..... 250/83.6 FT, 43.5 MR, 308, 250/432, 435; 315/111

[56] References Cited
UNITED STATES PATENTS

| | | |
|---|---|---|
| 3,174,035 | 3/1965 | Vanderschmidt ........ 250/83.6 FT X |
| 3,566,107 | 2/1971 | Taylor et al .............. 250/83.6 FT X |

Primary Examiner—James W. Lawrence
Assistant Examiner—Davis L. Willis
Attorney, Agent, or Firm—Harry A. Herbert, Jr.; J. L. Siegel

[57] ABSTRACT

An ionization detector in which a vapor sample flows past a source of ionizing radiation of beta particles and through a recombination region which forces the sample to pass through a tortuous path created by a series of parallel adjacent and spaced insulated washers mounted about a shaft with the washers having different selected openings. The sample first passes through a metallic manifold also having openings and then through the washers followed by the ion collection region which includes a screen of electrically conducting material. A DC voltage source connects the manifold and the screen with an ammeter in series therewith for readout.

3 Claims, 7 Drawing Figures

IONIZATION SYSTEM FOR SENSING AND MEASURING GASEOUS IMPURITIES

BACKGROUND OF THE INVENTION

This invention relates to detection of ions, and more particularly to a system for sensing and measuring gaseous impurities or vapors present in a carrier gas including air in low concentration.

The sensor operates at atmospheric pressure and may be rendered selective in response to manipulation of sensor parameters. It also makes use of the ability of gases and vapors to be ionized by ionizing radiation such as beta particles and of the ability of gaseous ions of opposite polarity to recombine into a neutral entity and of the ability of gaseous ions to be collected in the presence of an electrical field resulting in an electrical current.

In the past, ionization type detectors also made use of some or all of the above characteristics. The present detector, however, utilizes these phenomena in a different manner. In the present detector, ionization occurs in a field free volume bounded in part by one electrode. In the past ionization type detectors, ionization takes place within an electrical gradient. Also, beta electrons do not expend all their energy in the gas. They hit the surface of one of the electrodes and cause secondary electrons to be emitted. In the past ionization type detectors which use a beta source, the beta energy is chiefly expended in non-elastic collisions in the sample gas. In addition, electrode geometry and flow paths are arranged so as to promote recombination of ions prior to collection at the collector electrode, while in the prior art ionization type detectors, recombination of positive and negative ions is not enhanced.

SUMMARY OF THE INVENTION

Since ionization occurs in a field free region, there is no separation of charges due to an electrical gradient. Negative charge carries are primarily electrons which result from the gases being ionized and from secondary emission as beta particles strike a metal surface. These electrons are not significantly affected by gas flow and form a negative space charge in the ionizing region. Charge separation is affected by sweeping the larger positive ions out of the ionization region by the gas flow. If electronegative molecules are present in the carrier gas, they will attach electrons and form negative ions which are also swept out of the ionizing region with the positive ions. This results in a reduction of the negative space charge.

A net result of charge separation by flow is an intrinsic voltage bias on the cell with the electrode containing the ionizing region acquiring a negative charge. When an external bias is applied with either polarity, the intrinsic bias is algebraically added with the result than an assymetrical voltage-current characteristic is obtained.

Positive and negative ions which are swept out of the ionizing region are subjected to a tortuous flow path where ion recombination is enhanced by virtue of a large surface area to promote recombination. Other recombination phenomena also occur after passing through the recombination region such as dissociative and three-body recombination. The residual ions are collected in the collector region by the biased electrodes and are manifested as an electric current.

It is therefore an object of the invention to provide a novel and improved sensor of gases or vapors present in a carrier gas.

It is another object to provide an ionization sensor which separates the regions of ionization recombination and ion collection.

It is still another object to provide a method of manipulating selectivity by varying sensor parameters such as flow path and electrical bias.

It is yet another object to provide a method of manipulating selectivity by operating two or more sensors concurrently and electronically combining responses from each.

It is still another object to provide an ionization detector in which response is proportional to both flow and concentration.

These and other objects, features and advantages of the invention will become more apparent from the following description taken in connection with the illustrative embodiment in the accompanying drawings.

DETAILED DESCRIPTION OF THE PREFERRED EMBODIMENT

Figure 1:
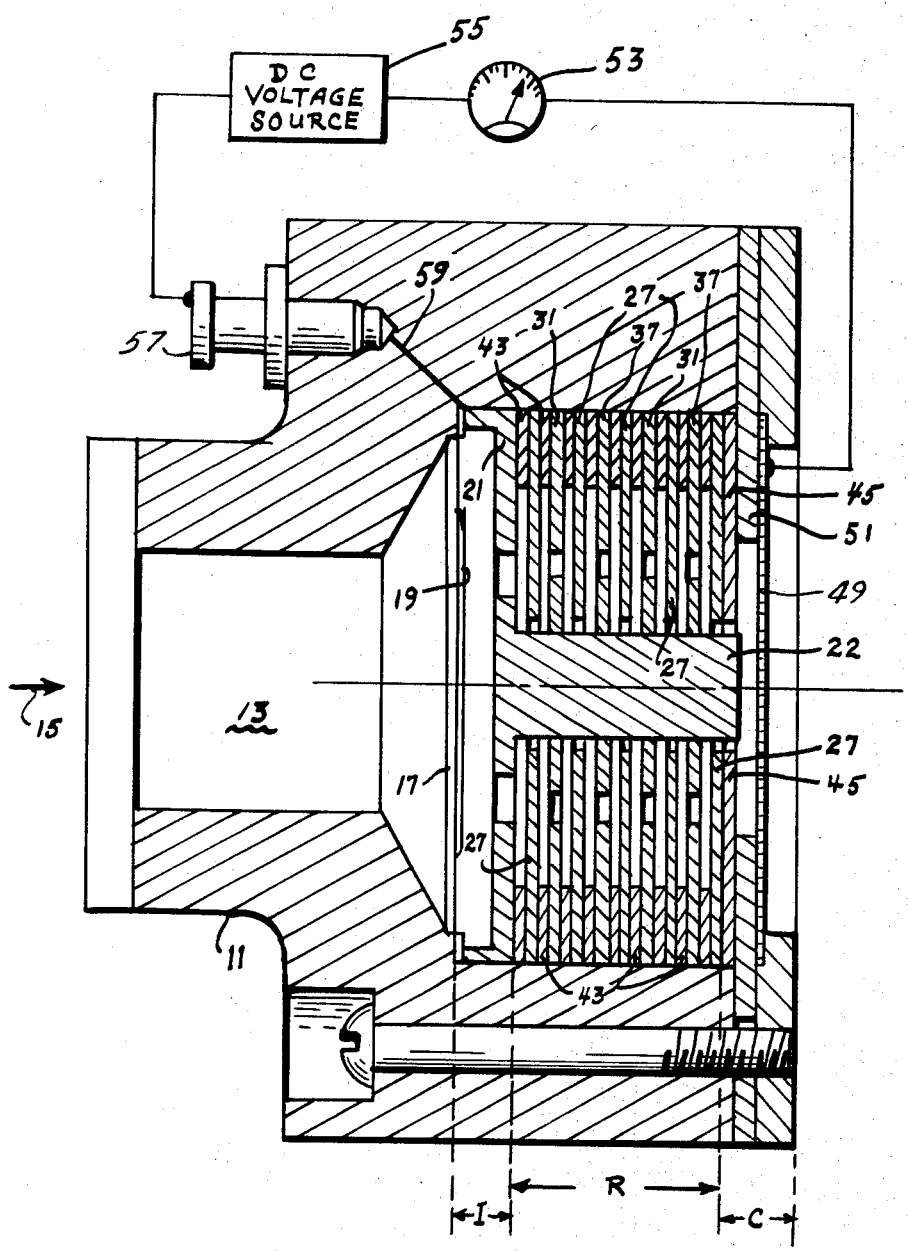
FIG. 1 shows a partially schematic and a partially cross-sectional view showing an embodiment of the invention.

Referring to FIG. 1, there is shown the ionization detector which includes housing 11 that forms air channel 13. Air flows into channel 13 as shwon by directional arrow 15. The air first enters the ionization region denoted as I which consists of ionizing source 17 which produces beta radiation and is attached to a screen 19 which is a mechanical device to mount source 17 and allow air to flow. Ionizing source 17 is so positioned so that ionizing radiation impinges on one surface of an electrode or a member connected to the electrode before energy is expended in collision with gas molecules.

Figure 2A:
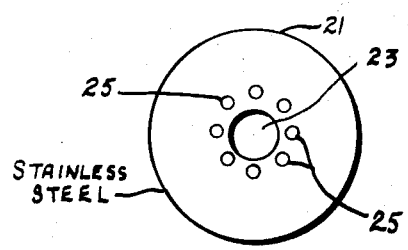
FIGS. 2a–2f are cross-section diagrams of the washers and screens used in the embodiment of FIG. 1.
Figure 2B:
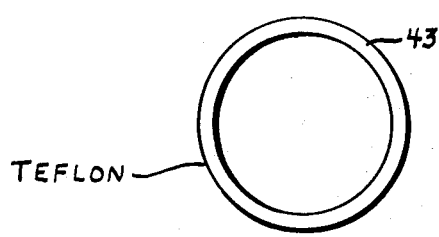

The gas sample passes through manifold 21 shown in cross-section FIG. 2a and is preferably constructed of stainless steel with central opening 23 being 3/16 inch and openings 25 surrounding central opening 23 being 1 mm in diameter. Extending from manifold 21 is integrally connected shaft 22.

Figure 2C:
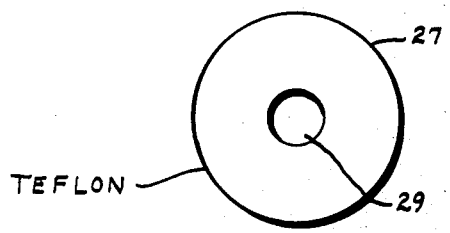
Figure 2D:
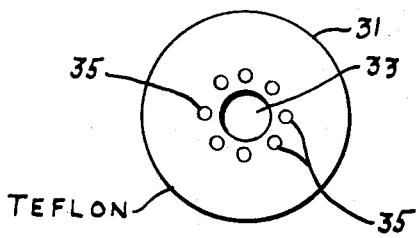
Figure 2E:
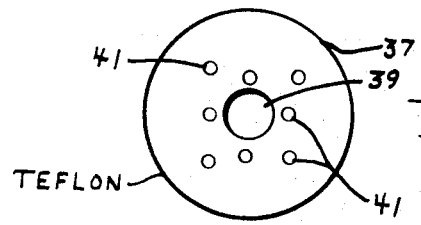

The sample then enters the recombination region denoted as R which consists of a sereis of washers or baffles mounted aobut shaft 22 which provide an elaborate and tortuous path through the unit which enhances ion recombination due to the large surface area. The sample passes through baffle 27 which is shown in cross-section in FIG. 2c and is preferably constructed of a synthetic resin polymer sold under the trademark of Teflon, with central opening 29 having a diameter of 7/32 inch. Next, the sample passes through baffle 31 having a cross-section as shown in FIG. 2d which is preferably constructed of Teflon and having central opening 33 with a diameter of 3/16 inch, and surrounded by holes 35 each with a diameter of 1 mm. The sample then passes through another baffle 27 followed by baffle 37 having a cross-section as shown in FIG. 2e which is preferably constructed of Teflon and having a central opening 39 with a dimaeter of 3/8 inch and having a configuration of holes 41 as shown each with a diameter of 1 mm. After this, the sequence of baffles repeat in the same order 27, 31, 27, 37, 27 and 37. Each of these baffles are separated by spacers 43 preferably constructed of Teflon.

Figure 2F:
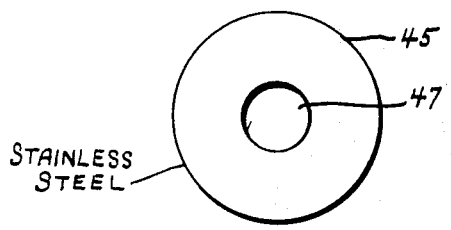

Upon completion of the path through the recombination region, the sample enters the collector region denoted by C which consists of conducting washer 45 preferably constructed of stainless steel having a cross-section as shown in FIG. 2f and forming central opening 47 having a diameter of 7/32 inch. Conducting washer 45 is in proximity to electrode or screen 49 but spaced therefrom by spacer 51.

With the formation of ions of impurities, a greater current will flow which is measured with ammeter 53 which is in series with screen 49 and electrode 57 that connects to manifold 21 by internal wire 59. A bias voltage from voltage source 55 is applied to the electrodes with the polarity depending upon the function of the sensor. The sensor assembly can function as a single unit or can be combined with other sensors, with the signals processed to enhance the selectivity and sensitivity.

What is claimed is:

1. An ionization detector comprising:
  a. a housing having an input and output for passage of vapor samples;
  b. a source of ionizing radiation mounted within the housing in proximity to the input;
  c. an electrically conducting manifold mounted with the housing and having a plurality of openings and in the path of impinging radiation from the ionizing radiation source;
  d. means for ion recombination including a series of adjacent and parallel baffles mounted within the housing in proximity to the manifold, the baffles being of electrically insulated material and spaced from each other with each of the baffles having a plurality of openings for passage of vapor samples;
  e. a collector washer of electrically conductive material adjacent to and parallel with the recombination means;
  f. an electrode screen at the output adjacent to and parallel to the collector washer and spaced therefrom;
  g. means for electrically biasing the detector including a DC voltage source connected to the manifold and screen; and
  h. an ammeter in series connection with the screen and the DC voltage source.

2. An ion vapor detector according to claim 1 wherein the ionization radiation is beta radiation.

3. An ionization vapor detector according to claim 2 wherein the recombination baffles are Teflon and the collector washer is stainless steel.

* * * * *